(12) United States Patent
Trifilo

(10) Patent No.: US 7,104,452 B2
(45) Date of Patent: Sep. 12, 2006

(54) METHOD AND SYSTEM FOR A BAR CODE SIMULATOR

(75) Inventor: Timothy M. Trifilo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 10/946,694

(22) Filed: Sep. 22, 2004

(65) Prior Publication Data

US 2006/0060652 A1    Mar. 23, 2006

(51) Int. Cl.
    *G06K 7/10* (2006.01)
(52) U.S. Cl. .................... 235/462.01; 235/462.45; 235/462.42

(58) Field of Classification Search ........... 235/462.45, 235/462.42, 462.46
    See application file for complete search history.

(56) References Cited

U.S. PATENT DOCUMENTS

| 5,760,383 A | 6/1998 | Heske, III ................. 235/462 |
| 6,685,093 B1 | 2/2004 | Challa et al. .......... 235/462.46 |
| 2002/0074404 A1* | 6/2002 | Drumm ................. 235/462.01 |

* cited by examiner

*Primary Examiner*—Seung Ho Lee
(74) *Attorney, Agent, or Firm*—Lily Neff; Cantor Colburn LLP

(57) ABSTRACT

An exemplary embodiment of the invention relates to a method and system for simulating data on bar code labels. The system and method include aligning a series of light sources in an array; and driving a selected number of the light sources in the array indicative of data on a bar code label to emit light having a wavelength simulating a light generated from a bar code scanner and reflected from a white space of bar code label.

19 Claims, 2 Drawing Sheets

METHOD AND SYSTEM FOR A BAR CODE SIMULATOR

BACKGROUND OF INVENTION

The present invention relates generally to a method and device for generating a signal that emulates the pattern of light reflected from a bar code when a pulse of light from a bar code scanner is applied to the bar code, and, more particularly, to a device that communicates with bar code scanners without the physical printed barcode.

Bar codes have been in use for many years and have become the standard for efficient and inexpensive coding and transfer of small amounts of data. The Universal Product Code (UPC), a bar code symbology standard, has become an indispensable merchandising system to identify manufacturers and products. There are many bar code standards available including the UPC, the European Article Number (EAN), Code 39, Code 93, Code 128, ISBN, and ISSN to name a few. Each standard has a specific symbology to code information, but every standard functions on the same basic bar and space premise. A bar code is comprised of a series of alternating black bars and white spaces of varying widths. Each bar and a space will have a minimum width that can be treated as the unit width for a bar and a space, respectively. At least one bar and one space of respective unit width typically appear at the beginning of each bar code sequence for proper calibration. Successive bar and spaces in a coded sequence will have widths that are integer multiples of the unit width and the bar code information is coded by the pattern of varying widths in a sequence of alternating bars and spaces. The bar code sequence can be printed on a medium and affixed to a product or item for identification.

The bar code can be read and decoded by a bar code scanner signal that passes a pulse of light over a printed bar code and detects the back-scattered light patterns reflected by the bar code. A bar will absorb a large portion of the scanner signal while a space will reflect a large portion of the scanner signal. The durations of the absorption and reflectance patterns gathered by the scanner as back-scattering of the scanner signal corresponds to the widths of the corresponding bars and spaces of the bar code. It will be noted that CCD readers quantize an image and perform bitwise analysis to distinguish marks from spaces, and vice versa, and do not sense impulses of light. In either way, the coded information is transferred from the printed bar code to the scanner. All bar code standards operate in this fashion Bar codes have been used in automated shipping and packaging systems. In some instances, bar code readers are used extensively along a conveyor line to provide information to an operator as to where certain products are in the line. However, some bar code readers are virtually inaccessible to operators while machinery, associated with the automated shipping and packaging systems, is running. For example, in clean rooms associated with packaging semiconductors, operator presence is often restricted. Therefore, if a bar code reader is not operating properly because of a fault, the bar code reader may not properly indicate a fault occurrence such as an absence of semiconductor wafers from the line because of a fall therefrom, for example. Furthermore, printed bar codes do not allow data represented thereon to be easily changed to verify proper fault reporting by the bar code readers.

Accordingly, a method and system to simulate bar code labels having data that can be automatically and easily changed is desired.

SUMMARY OF INVENTION

The foregoing discussed drawbacks and deficiencies of the prior art are overcome or alleviated by a method and system for simulating data on bar code labels. The method includes aligning a series of light sources in an array; and driving a selected number of the light sources in the array indicative of data on a bar code label to emit light having a wavelength simulating a light generated from a bar code scanner and reflected from a white space of bar code label.

An exemplary embodiment of the invention also includes a system for simulating a bar code that includes a series of LEDs aligned in an array, and a driver interface adapted to selectively drive a selected number of LEDs in the array indicative of data on a bar code label to emit light having a wavelength simulating a light generated from a bar code scanner and reflected from a white space of bar code label.

BRIEF DESCRIPTION OF DRAWINGS

Referring to the exemplary drawings wherein like elements are numbered alike in the several FIGURES.

DETAILED DESCRIPTION

Disclosed herein is a method and system for providing a simulated bar code readable by both sequential bar code scanners and charge-coupled device ("CCD") bar code scanners. CCD scanners are able to scan both linear or one dimensional (1-D) and two dimensional (2-D) bar codes.

Figure 1:
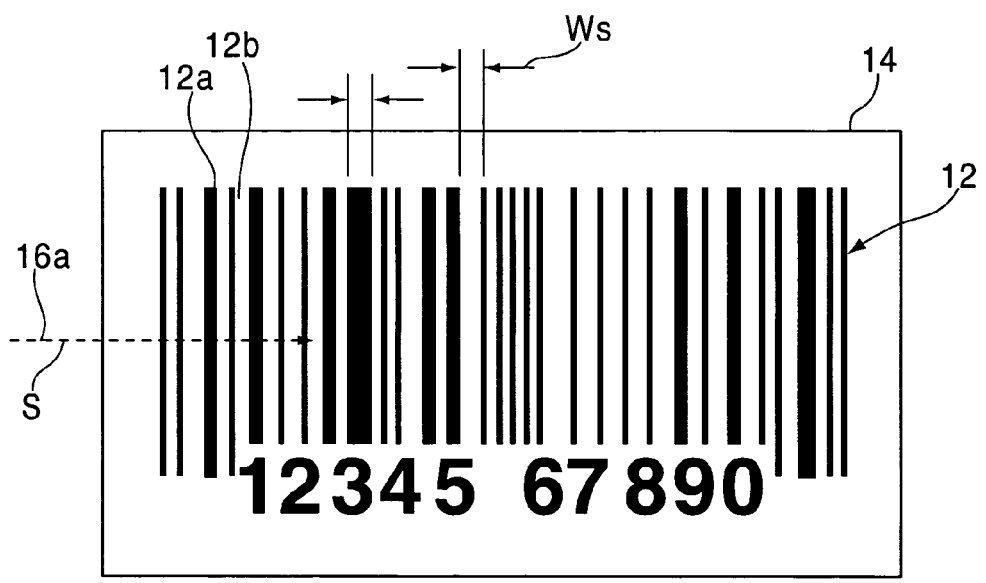
FIG. 1 is a plan view of a conventional printed UPC bar code label.

Referring to FIG. 1, an exemplary bar code 12 includes a sequence or series of geometric bars 12a and spaces 12b of varying widths $W_b$ and $W_s$, respectively. The bar code 12 may take any conventional form such as the Universal Product Code (UPC) shown in FIG. 1, or the Code 39 symbology shown in FIG. 2. Conventional bar code symbology determines the sequence and width requirements of the bars and spaces for encoding desired data within the bar code 12. The bar code 12 may be one-dimensional as illustrated or two-dimensional if desired. In either case, data is represented by the varying width of the bars and spaces.

Figure 2:
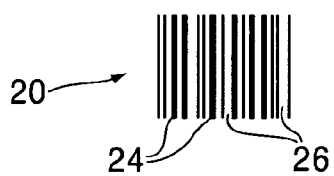
FIG. 2 is a plan view of a conventional printed Code 39 bar code label.

Referring now to FIG. 2, a bar code 20 utilizes a series of vertical lines, i.e., bars 24, and spaces 26 to represent an identification code. Different combinations of the bars and spaces can be used to represent different characters.

Conventional bar code scanners include sequential bar code scanners and charge-coupled device ("CCD") bar code scanners. A sequential bar code scanner, for example, uses a scanning beam, typically narrow band light in the visible spectrum such as a red light from a laser, but potentially any bandwidth of light in the visible or infrared spectra can be used, to pass over a sequence of bars and spaces such as bar 24 and space 26 sequentially, e.g., left to right and/or right to left. Another type of sequential scanner is a wand scanner, which is swept across the bar code by a user to create the scanning beam. As the scanning beam of light scans across the bar code 20, the beam is at least partially reflected back to the scanner by the spaces 26 and is at least partially absorbed by the dark bars 24. A receiver, such as a photocell detector, in the bar code scanner receives the reflected beam and converts the beam into an electrical signal. As the beam scans across the bar code, the scanner typically creates a low electrical signal for the spaces 26, i.e., reflected beam, and a high electrical signal for the bars 24, i.e., where the beam is absorbed. The scanner may, however, create a low electrical signal for the bars 24 and a high electrical signal for the spaces 26. The width of the elements determines the duration of the electrical signal. This signal is decoded by the scanner or by an external processor into characters that the bar code represents.

In a CCD scanner, however, the scanner takes a digital image of the bar code and decodes the barcode using software that is well known in the art to convert the elements into the identification code. In either a sequential bar code scanner or a CCD scanner, the contrast between the bar and space elements is used to distinguish the elements and decode the bar code.

Figure 3:
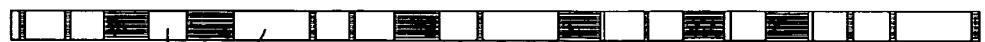
FIG. 3 illustrates a view realized by a bar code scanner when the bar code label of FIG. 2 is scanned by a laser.

FIG. 3 depicts how a sensor of a bar code reader (not shown) would see bar code 20 of FIG. 2 when scanned by a laser. It will be recognized that when bar code 20 is scanned by the laser or other high intensity monochromatic or semi-monochromatic light source, the black vertical lines (e.g., bars 24) of the bar code absorb light and the light areas (e.g., spaces 26) reflect light back to a sensor of the scanner. Areas that are white in the original bar code are illuminated with a red light from the laser indicated at 36. In most cases, the red light has a wavelength of about 650 nm. It should be noted here that most semiconductor laser diodes used by the laser to generate the red light are constructed similarly to light emitting diodes (LEDs). Therefore, the LEDs are commonly available to generate an identical wavelength as the laser diodes used in the laser. The sensor is shielded by an optical filter configured to attenuate all but a wavelength of the light from the laser to limit external noise.

Once the reflected light from the white areas is reflected back to the sensor of the bar code reader, the bar code reader quantizes the image, runs a thresholding algorithm, and normalizes the data to a fixed array based on how many characters were scanned between the start and stop code. Bar codes can be scanned in any direction and orientation due to the start/stop code. This extensive post processing is necessary to accommodate bar codes of varying size and scanning bar code labels from varying distances. It will be recognized by those skilled in the pertinent art that software in most bar code readers is very good at "hunting" for the data within the bar code.

Figure 4:
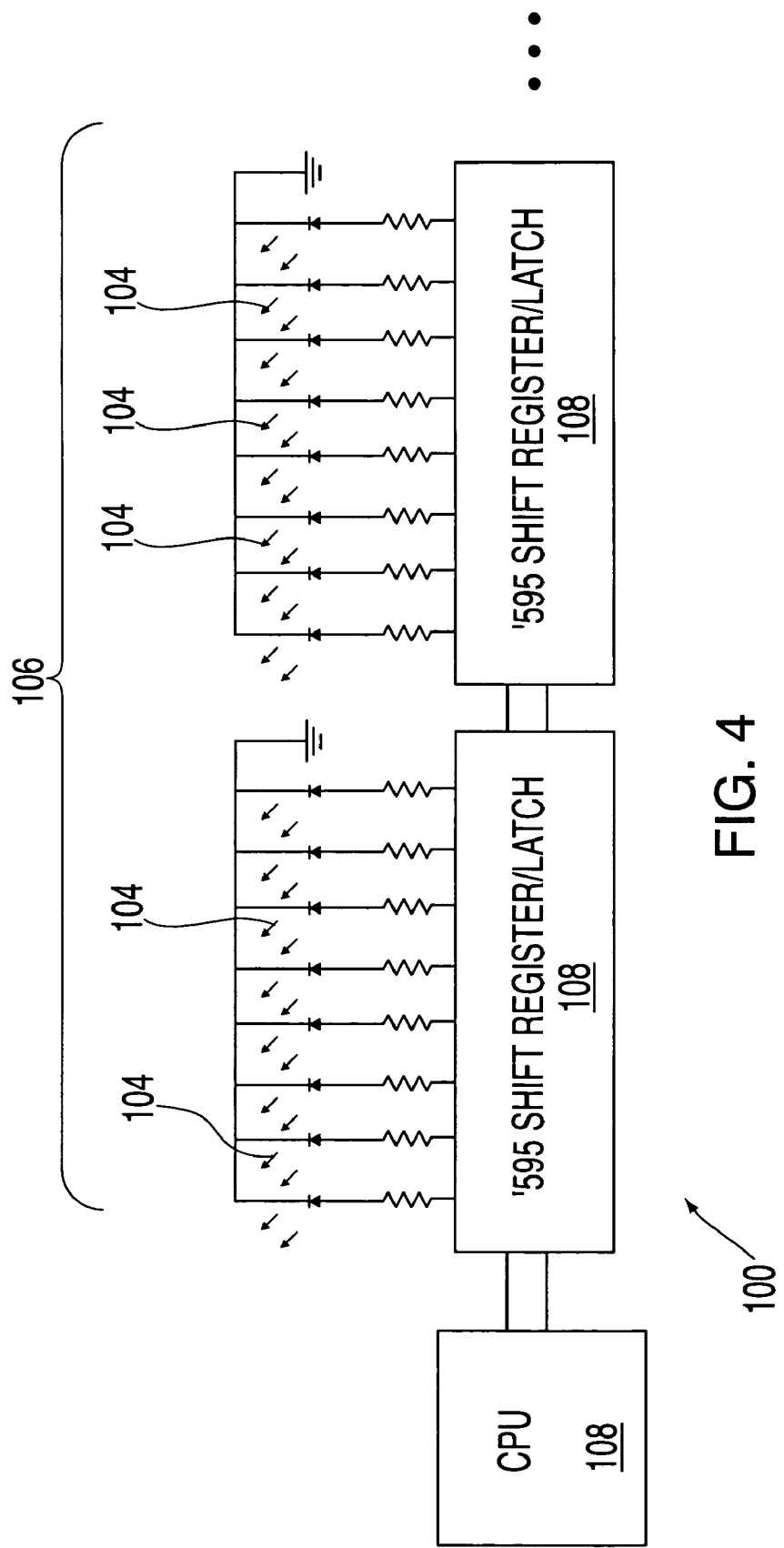
FIG. 4 is a schematic diagram of an electrical circuit to electrically simulate a printed bar code label using an array of LEDs in accordance with an exemplary embodiment.

Referring now to FIG. 4, an exemplary embodiment of a system for simulating a bar code is illustrated at 100. System 100 includes a microprocessor 102 driving a series of LED lamps 104 as a light source in a linear array 106 via a driver interface 108 for the purpose of electronically simulating a bar code label. The driver interface 108 includes a discrete input/output (DIO) interface or a shift register/latch interface, for example. As illustrated, the driver interface 108 is a shift register interface (e.g., a 74HC595 shift register) operable to simulate a bar code through LEDs 104. Each shift register 108 (two shown) supports eight LEDs 104 when using an 74HC595 shift register. FIG. 4 illustrates two shift registers each driving eight corresponding LED lamps 104.

FIG. 4 illustrates a schematic diagram of one embodiment of an electronic bar code simulator (EBCS) device 100 according to the present invention. The bar code simulator comprises the microcontroller 102 operably coupled to an array of LED lamps 104 via the driver interface 108. The array of LED lamps 104 generate a light having a wavelength readable by a photo detector of a bar code reader (not shown). The photo detector may be any applicable type of photo detector, such as a photo diode or a photo transistor, that can detect light in an applicable frequency band of a bar code scanner, such as infrared (IR), visible, or both. The photo detector detects a light signal emitted from the array of LED lamps 104.

The microcontroller 102 coordinates the activities of determining how and when to electronically simulate a bar code that can be detected by a bar code scanner. It is to be understood that the EBCS device 100 comprises the microcontroller 102 coupled to the driver interface 108 and the array 106 of LEDs 104, and is configured to coordinate activities of the EBCS device 100. The microcontroller 102 can be configured to provide a simulated bar code signal emitted from the LED lamps 104 that simulates a reflected light signal from a printed bar code label. According to some embodiments of the bar code simulating device 100, selected light signals from selected LEDs 104 of the LED array generates simulated back-scattered light patterns reflected from a printed bar code. The simulated signal is generated by modulating LEDs 104 of the LED array 106 to correspond to a bar and space pattern of a bar code. When an LED 104 of the LED array 106 is emitting light, i.e., when it is in an "ON" state, the emitted light corresponds to a space in the bar code by mimicking a high level of light reflected by the white space of the bar code. When the LED 104 of the LED array 106 is not emitting light, i.e., when it is in an "OFF" state, it corresponds to a bar in the bar code by mimicking a low level of light reflected by the black bars of the bar code. Each LED lamp 104 of the LED array 106 is modulated "ON" or "OFF" that corresponds to a width of a particular space or bar, respectively. A coded sequence of "ON" and "OFF" states of each LED 104 in the array 106 can be provided to emulate the reflection pattern of a bar code, and can be provided to the bar code scanner's detection mechanism in a manner indistinguishable from a printed bar code. Further, since the LEDs 104 emit light having substantially the same wavelength of a laser in the bar code scanner, the laser in the reader itself becomes irrelevant. For optimal performance, it will be recognized by one skilled in the pertinent art that the LED array 106 should be disposed within a flat black enclosure.

Still referring to FIG. 4, the assignee of the present application uses an 11S bar code for virtually all parts. The 11S bar code is 22 characters in length and is representative of a one dimensional (1-D) bar code. In an exemplary embodiment, a 0402 surface mount device (SMD) LED is used for each LED 104 in the array 106. More specifically, each SMD LED is 1 mm×0.5 mm×0.5 mm with a 0.25 mm gap between contiguous SMD LEDs. Thus, the 22 characters of an 11S bar code would be represented by an array 106 of SMD LEDs each having a light output of 650 nm to physically simulate the 11S label. The length of this array would about 123.75 mm or approximately 4.8 inches long. This dimension is not prohibitively large to manufacture, but is roughly twice the length of the original printed 11S bar code label. More specifically, assuming a code 3 of 9, the average character length would be 9 slots. Therefore, (9 slots×22 characters)=198 LEDs for 22 characters. Since each LED is about 0.5 mm wide, the total length of the serial array is 99 mm if the LEDs abut one another. If spacing of 0.125 mm is added between contiguous LEDs, the total length of the LED serial array would be 123.75 mm (e.g.,

[99 mm+(198×0.125)=123.75 mm]. However, a spacing of 0.25 mm may be employed to further allow manufacturing ease of assembly.

It is to be understood that the LEDs 104 are but one light source contemplated for use to simulate a bar code that may emit light in more than one frequency band, e.g., IR, visible, or both, and that other light sources are envisioned. In addition, the LED array should be spectrally capable of emitting light at the known wavelength of scanners. This may be one or both of IR or visible light frequency bands.

Furthermore, the LED array is configurable to simulate any type of barcode known in the art, such as, but not limited to, a UPC, EAN, Interleaved 2 of 5, Code 93, Code 128, and Code 39, or specially designed bar code types, including one and two dimensional codes.

It should also be pointed out that the bar code reader may need to employ an inversion, as the bar code reader "sees" white space. In other words, the white space is the absence of a mark on a printed bar code label. The LED array creates light wherever a mark would not be present. The reader employs software that easily computes the bar code algorithm and inverts the array. This inversion of the array happens substantially instantaneously. Again, the laser in the reader itself becomes irrelevant since the LED array from the simulated bar code emits light in the same wavelength readable by the reader neglecting a need for the laser to generate light to be reflected back to the scanner from the white spaces.

As will be appreciated from the above description, the electronic simulated bar code device and method allows a bar code reader/scanner to read the simulated bar code irrelevant of the laser associated with the reader/scanner. Furthermore, the electronic simulated bar code device and method allow data associated with the electronic bar code to be changed. In this manner, the LED array can be changed having a bar code indicative of a fault to check fault reporting in a packaging line, for example. The interface provided by the system and method of the invention allows verification of automated systems using a virtual bar code that is easily changed and can be changed automatically if desired.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A method for simulating data on bar code labels, the method comprising:
   aligning a series of light sources in an array, each of the light sources comprising a 0402 SMD LED configured to emit a wavelength of light of about 650 nm; and
   driving a selected number of the light sources of the array simultaneously in a selected pattern indicative of data on a bar code label to emit light having a wavelength simulating a light generated from a bar code scanner and reflected from a white space of bar code label,
   wherein a number of contiguous light sources that are simultaneously on is directly proportional to a size of the white space.

2. The method of claim 1, wherein each light source is configured to selectively emit the light having a wavelength readable by the bar code scanner.

3. The method of claim 2, wherein the bar code scanner is one of a CCD bar code scanner and a sequential bar code scanner.

4. The method of claim 1, wherein the array of light sources is one of a one dimensional (1-D) and a two dimensional (2-D) array of LEDS to electronically simulate one of a one dimensional (1-D) and a two dimensional (2-D) bar code, respectively.

5. The method of claim 1, further comprising:
   driving the selected light sources of the light source array with a driver interface operably coupled to a microcontroller.

6. The method of claim 5, wherein the driver interface is one of a shift register, latch, and a DIO.

7. The method of claim 1, wherein the each 0402 SMD LED has dimensions of about 1 mm×0.5 mm×0.5 mm thick having a space of about 0.25 mm between contiguous LEDs.

8. The method of claim 7, wherein a bar code label indicative of 22 characters is simulated by an SMD LED array of about 123.75 mm in length.

9. The method of claim 1, further comprising:
   disposing the light source array in a flat black enclosure.

10. The method of claim 1, wherein a laser of the bar code scanner is irrelevant as a result of light selectively emitted from the LED array.

11. A device for simulating data on a bar code label comprising:
    a series of LEDs aligned in an array, each of the light sources comprising a 0402 SMD LED configured to emit a wavelength of light of about 650 nm; and
    a driver interface adapted to selectively drive a selected number of LEDs of the array simultaneously in a selected pattern indicative of data on a bar code label to emit light having a wavelength simulating a light generated from a bar code scanner and reflected from a white space of bar code label,
    wherein a number of contiguous light sources that are simultaneously on is directly is proportional to a size of the white space.

12. The device of claim 11, wherein each light source is configured to selectively emit the light having a wavelength readable by the bar code scanner.

13. The device of claim 11, wherein the bar code scanner is one of a CCD bar code scanner and a sequential bar code scanner.

14. The device of claim 11, wherein the array of light sources is one of a one dimensional (1-D) and a two dimensional (2-D) array of LEDS to electronically simulate one of a one dimensional (1-D) and a two dimensional (2-D) bar code, respectively.

15. The device of claim 11, wherein the driver interface is operably coupled to a microcontroller.

16. The device of claim 15, wherein the driver interface is one of a shift register, latch, and a DIO.

17. The device of claim 11, wherein each 0402 SMD LED has dimensions of about 1 mm×0.5 mm×0.5 mm thick having a space of about 0.25 mm between contiguous LEDs.

18. The device of claim 17, wherein a bar code label indicative of 22 characters is simulated by an SMD LED array of about 123.75 mm in length.

19. The device of claim 11, wherein the light source array is disposed in a flat black enclosure.

* * * * *